United States Patent [19]

Drexler

[11] Patent Number: 4,642,803
[45] Date of Patent: Feb. 10, 1987

[54] OPTICAL DATA RETRIEVAL SYSTEM FOR MULTI-CHARACTERISTIC REFLECTIVE DATA STORAGE MEDIA

[75] Inventor: Jerome Drexler, Los Altos Hills, Calif.

[73] Assignee: Drexler Technology Corporation, Mountain View, Calif.

[21] Appl. No.: 707,538

[22] Filed: Mar. 4, 1985

Related U.S. Application Data

[63] Continuation of Ser. No. 406,719, Aug. 9, 1982, abandoned.

[51] Int. Cl.$^4$ .......................... G11B 27/36; G11B 7/00
[52] U.S. Cl. ........................................ 369/54; 369/58; 369/101; 369/111; 365/200; 250/562; 250/578
[58] Field of Search ................. 369/53, 54, 58, 100, 369/101, 106, 111, 116, 121, 124; 365/120, 127, 200; 358/113; 250/570, 578, 562

[56] References Cited

U.S. PATENT DOCUMENTS

| | | | |
|---|---|---|---|
| 3,305,633 | 2/1967 | Chernoch | 358/113 |
| 3,624,286 | 11/1981 | Bosomworth | 369/106 |
| 4,051,329 | 9/1977 | Blondet | 369/116 |
| 4,145,758 | 3/1979 | Drexler et al. | 365/200 |
| 4,278,756 | 7/1981 | Bouldin | 346/135.1 |
| 4,284,716 | 8/1981 | Drexler | 430/510 |
| 4,355,318 | 10/1982 | Miyouchi | 369/54 |
| 4,363,116 | 12/1982 | Kleuters | 369/44 |

OTHER PUBLICATIONS

"Holographic Disc Diffraction Efficiency Tester" by Lawton, IBM Tech. Disc. Bul., vol. 23, No. 6, Nov. 1980, pp. 2424–2425.

*Primary Examiner*—Alan Faber

[57] ABSTRACT

A system for recovering data, both prerecorded and user data, from a reflective optical data storage medium, with the further capability of distinguishing data from foreign particulate matter on the data disk. A pair of detectors measures the fraction of light reflected from and transmitted through the data disk and, knowing the fraction of light absorbed by the disk, distinguishes user data from prerecorded data and particulate matter. The data disk has different optical characteristics for prerecorded and user data, the prerecorded information being black, highly absorptive silver, while the user data consists of pits of relatively high transmissivity in a reflective field. Particulate matter is recognized by intermediate reflectivity and transmissivity. The optical characteristics of the material are enhanced or exaggerated so that the two types of data and particulate matter can be distinguished.

10 Claims, 7 Drawing Figures

OPTICAL DATA RETRIEVAL SYSTEM FOR MULTI-CHARACTERISTIC REFLECTIVE DATA STORAGE MEDIA

This is a continuation of co-pending application Ser. No. 406,719 filed on Aug. 9, 1982, now abandoned.

TECHNICAL FIELD

The invention relates to data recovery from a storage medium, and in particular to recovery of data from an optical storage medium having different optical characteristics for prerecorded and user recorded data.

BACKGROUND ART

Laser recording and data storage material having different optical characteristics are known. For example, U.S. Pat. No. 4,284,716 to J. Drexler and E. Bouldin, assigned to the assignee of the present invention, for "Broadband Reflective Laser Recording and Data Storage Medium with Absorptive Underlayer," describes a broadband reflective laser recording and data storage medium for direct reading after writing. It is formed from the conversion of a photosensitive silver halide emulsion into a reflective, stable silver-gelatin coated substrate in which the silver-gelatin coating is easily pitted by impingement of a laser beam.

The chemical conversion of the raw silver-halide emulsion material into the laser recording material described in the patent requires four steps. First, a non-saturating actinic radiation exposure is used to define areas for user data recording. A normal photographic development is used to produce a medium of gray neutral density. The surface of the remaining silver halide is chemically fogged in a water or alcohol base solution to create a very thin layer of silver precipitating nuclei on the surface. Finally, a single step, negative silver diffusion transfer process is used to dissolve the unexposed and undeveloped silver halide, forming silver ion complexes. These complexes are transported by diffusion transfer to the sites of the silver precipitating nuclei and the filamentary silver. The resulting reflective coating has a high concentration of non-filamentary silver particles at the surface of a low melting temperature colloid matrix. This matrix forms an underlayer which is partially absorptive to light. The reflective surface layer and absorptive underlayer have a composite reflectivity ranging between 50% and 30%, a transmissivity in the range of 10% to 0.1% of the light actually entering the surface of the medium and an absorptivity within the range of 90% to 99.9% of the light actually entering the surface of the medium.

Writing of data on the medium is accomplished by creation of low reflectivity spots in a reflective field. This is done either through laser writing, through hole melting in the reflective medium or photographic prerecording by light exposure and black development.

Laser writing on this recording material is accomplished by melting holes or pits in the reflective surface with a low power laser. A laser beam or focussed light beam is used for reading recorded data. The beam impinges on the recorded pits with greatly reduced specular reflection due to scattering and absorption by the pitted underlayer. The reductions in reflectivity are measured by a detector and converted to electrical impulses corresponding to data.

One of the advantages of this medium is that it also can be photographically prerecorded. In the first non-saturating exposure step a pattern can be formed by exposure through a mask or scanning light source, which are processing, yields two different surface reflectivities. This pattern resides both in the reflective layer and in the underlayer, below the reflective surface layer, or in laterally adjacent areas.

One of the problems which occurs in reading reflected light from pits in the medium is that it is not possible to distinguish between a pit or hole having low surface reflectivity due to scattering and absorption of light, and black prerecorded silver which also has low surface reflectivity or high light absorption. It is also difficult to distinguish between these two kinds of data and certain types of material defects, including foreign particulate matter and material inhomogeneities which create spots of low reflectivity by either light scattering or absorption.

U.S. Pat. No. 4,145,758 to J. Drexler and C. Betz, assigned to the assignee of the present invention for "Error Checking Method and Apparatus for Digital Data in Optical Recording Systems" describes a data reading system wherein digital data is written onto a transmissive medium, such as a photoplate, by a modulated laser whose beam is detected by a first photodetector means which measures laser output directed toward the recording medium. A second photodetector means measures light scattering from the medium, while a third photodetector detects and measures light transmitted through the recording layer of the medium surface to confirm recording of the data. Amounts of transmitted light or scattered light from the medium during the recording process are correlated to the laser output into expected values of light for detecting errors in recording immediately after the time of recording. This error detection system is intended for light transmissive media and would not be used in reading reflective media. The defects are detectable by the apparatus before laser recordings themselves are detectable.

An object of the present invention is to distinguish in reading the data between laser recorded pits or holes and photographically prerecorded data in the form of black silver areas in a field of reflective silver. Another objective of the invention is to distinguish between laser recorded data on the reflective optical data storage media of the metallic film type or metal organic composites and light absorptive foreign particles in the recording media. Another object is to distinguish between light absorptive photographically prerecorded data and light absorptive foreign particles in the recording media.

DISCLOSURE OF INVENTION

The above objects have been achieved with a laser system capable of distinguishing optical data on optical storage disks, optical cards or optical tape of the type having a plurality of distinguishing optical characteristics which are interpreted by simultaneous measurements of specular reflectivity and optical transmissivity. The different optical characteristics are associated with different types of previously recorded data in different lateral portions of the medium. Different optical characteristics are also associated with foreign particles in the medium as distinct from those representing recorded data.

In reflective silver-based recording media of the type described in U.S. Pat. Nos. 4,278,756 and 4,284,716 data is photographically prerecorded in certain areas prior to formation of the reflective silver laser recorded data in other areas. Photographically prerecorded data may be black or have a duller silver appearance having higher transmissive optical density to infrared than the unrecorded reflective surface and lower specular reflectivity to infrared and visible light. Laser recorded data, consisting of pits penetrating a highly reflective field or surface layer, have a lowered transmissive optical density than the unrecorded reflective surface since the pits penetrate part way through the medium and lower specular reflectivity owing partly to the pits scattering light. Foreign particulate matter in the surface will reduce both the composite surface reflectivity and the light transmissivity of the medium. By the photographically prerecorded data greatly reducing the light transmissivity of the medium to infrared and the laser recorded holes increasing the light transmissivity to infrared, the presence of foreign particulate matter can be identified by its intermediate transmissivity. Simultaneously, foreign particulate matter produces higherreflectivity than either photographically prerecorded or laser recorded user data, but not as much as the reflective field in which laser recorded user data is located. By simultaneously measuring light reflection at a point and light transmission through the medium at that point, photographic prerecorded data, laser recorded user data and foreign particulate matter may be distinguished from one another and thereby identified.

BEST MODE FOR CARRYING OUT THE INVENTION

Figure 1:
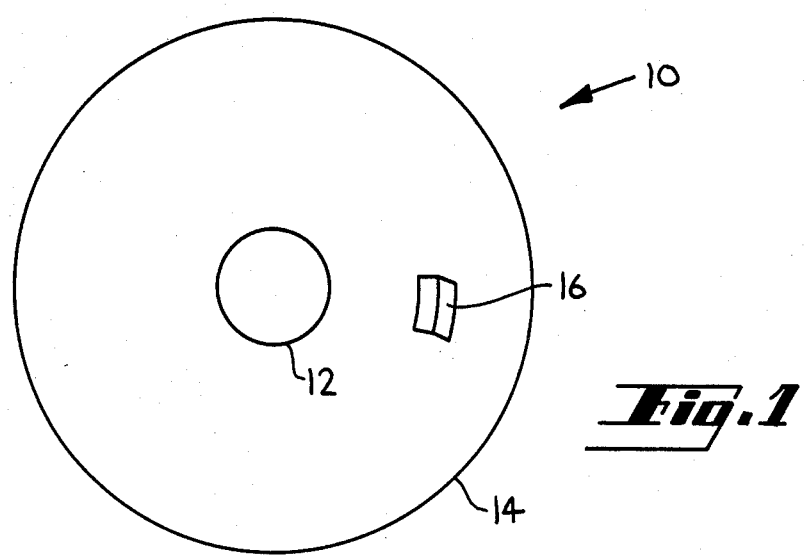
FIG. 1 is a top plan view of a laser recording medium in accord with the present invention.

In FIG. 1 an optical recording medium is shown to be a disk 10 having a central aperture 12 and an outer edge 14. The medium need not be a disk, but could also be a card. The description of a disk is merely exemplary. Data is recorded in circular tracks 16 partially shown in enlarged detail. Both user data and prerecorded data are stored on the disk, in different lateral areas, as discussed with reference to FIG. 4.

Figure 2:
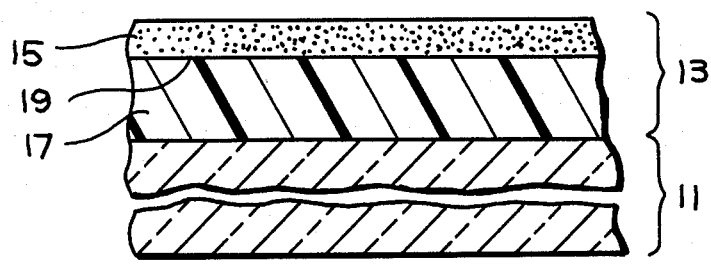
FIG. 2 is a side sectional view of an optical information record medium for use with the system of the present invention.

With reference to FIG. 2, an optical recording medium is preferably a laser recordable medium of the kind described in U.S. Pat. No. 4,284,716. Briefly, the two-layer medium described in the patent is made as follows.

The surface of a fine grained silver-halide emulsion photo-sensitive medium, for example a Lippman emulsion, is exposed briefly to a low-to-moderate level of actinic radiation. A mask is used for creating a prerecorded pattern, for example a servo track pattern in different lateral areas from user data areas. This exposed silver halide is then developed to an optical density of 0.05 to 2.0, as measured with red light of a photographic densitometer. This gelatin layer containing filamentary silver particles exhibits an optical density of typically 0.05 to 0.8 for a 3 micron emulsion and 0.1 to 1.5 for a 6 micron emulsion. After this initial processing step, the emulsion layer is gray in appearance, but a large amount of the silver halide in the emulsion remains unaltered. A very thin layer of unexposed silver halide at the surface of this partially developed emulsion layer is then chemically fogged to form a very dense layer of silver precipitating nuclei at that surface. The fogged medium is finally subjected to a negative silver diffusion transfer step wherein the silver halide in the emulsion is solvated to form soluble silver complexes. These silver complexes are precipitated on the silver precipitating nuclei to form a reflective layer comprising non-filamentary silver particles which aggregate with the filamentary silver. The degree of reflectivity of the surface may be adjusted over a range of values depending upon the ratios of the two types of silver, but should be about 40%. This same mechanism also causes some of the silver ion complex to precipitate on the filamentary silver in the absorptive underlayer, increasing the optical density to red light of this already developed underlayer typically by at least a factor of two increase in light absorption.

The final result of these two exposure/development sequences is a superior reflective laser recording medium which is comprised of a very thin layer of reflective but non-electrically conducting reduced non-filamentary silver and a much smaller amount of filamentary silver, under which lies a highly absorptive layer consisting primarily of filamentary silver in a gelatin matrix. This absorptive underlayer typically has a final optical density to red light of between 0.2 to 3.0. The original silver-halide emulsion photosensitive medium which eventually results in the above described reflective laser recording medium is usually coated on either a plastic or glass substrate. The reflective surface has a reflectivity to red light of 40% for a typical sample.

Laser recording on this reflective surface can be made very efficient. The absorptive filamentary silver particles in the reflective layer can be increased until the minimum acceptable reflectivity is reached. These filamentary particles are absorptive over a very wide spectrum range from ultraviolet to near infrared, permitting a wide variety of lasers to be used for recording. Also, the light energy that is not absorbed by the reflective layer is substantially absorbed by the underlayer which causes a rise of temperature at the interface of the reflective layer and underlayer, thereby facilitating the melting of the reflective layer. Recording is accomplished by use of a laser beam to melt the gelatin at a spot in the reflective layer, thereby reducing the specular reflectivity at the spot. Before recording, the reflectivity of the reflective layer is specular; in other words incident light perpendicular to the surface will be reflected back towards its origin in a parallel line. After recording, perpendicular incident light will be diffusely reflected because the light returning towards the source will be scattered as opposed to parallel. This latter effect and the increased absorptivity at the spot lead to a lowered specular reflectivity. The absorptive underlayer would be only slightly penetrated by the recording process. None of the silver in either layer is melted during the recording process.

Such a medium may be seen in FIG. 2. A glass or plastic substrate 11 has a very thin Lippman emulsion 13 processed as briefly described above and as described more fully in the aforementioned U.S. Pat. No. 4,284,716. This emulsion has an upper layer 15 which is highly reflective and an underlayer 17 which is highly absorptive. In FIG. 2 the two layers are separated by a boundary 19, but this is only for purposes of illustration. In practice, there is a smooth transition between the highly reflective upper layer 15 and the highly absorptive underlayer 17, with no discontinuous boundary therebetween. Upper layer 15 consists primarily of non-filamentary silver particles which are roughly spherical in shape, while the underlayer 17 consists of filamentary silver particles which are elongated in shape. In both layers, the particles are suspended in gelatin. Usually, the volume concentration of silver particles in the reflective layer 15 is a minimum of 20% and a maximum of 50%.

Figure 3:
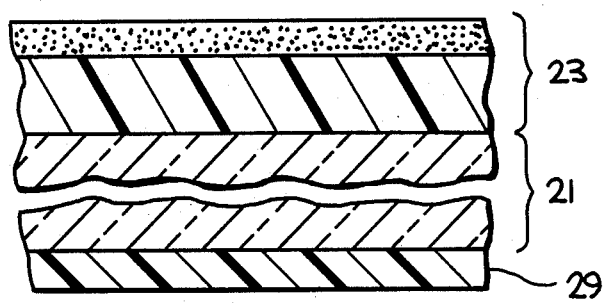
FIG. 3 is a side sectional view of an alternate optical information record medium for use with the system of the present invention.

In the event that it is desired to enhance the optical density of the material, the configuration of FIG. 3 may be used. Substrate 21, a glass or plastic sheet, has an emulsion 23 identical to emulsion 13, beneath reflective layer 25. An additional feature of the recording medium of FIG. 3 is a black developed emulsion, preferably a Lippman emulsion 29, on the opposite side of substrate 21 from emulsion 23. The backside layer 29 is chemically developed so that the silver therein is primarily black filamentary silver with an optical density between perhaps 0.2 and 3.0 after development. A pattern may be incorporated into this layer for security purposes, such as a repetitive line pattern. Such a pattern could be taken into account by the detection system and serve to deter forgery since a medium coated on both sides would usually not be a stock material, but would be specially manufactured.

Figure 4:
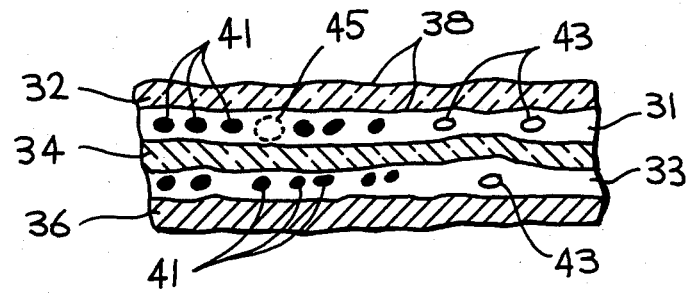
FIG. 4 is a detail top view of the record medium of FIG. 1.

With reference to FIG. 4 a pair of data tracks 31 and 33 are shown to be laterally spaced between prerecorded guide tracks 32, 34 and 36. These guide tracks may be photographically prerecorded black silver with edges 38 having an undulating character which may serve to modulate a light beam at a distinctive frequency. The servo tracks define the data tracks as lanes or tracks laterally between servo tracks. Within track 31 dark spots 41 may be seen. These dark marks represent prerecorded data which may be control information, database data, or the like. The oval marks 43 represent pits in the reflective surface layer of the disk made by pitting the surface layer with bursts of laser energy.

The dashed line 45 represents the size of a laser beam for reading either prerecorded or user data. The beam is less than the width of a track and on the same order of magnitude as the size of a data bit. Preferably, a semiconductor laser with an infrared beam is used. Infrared is superior because of its ability to pentrate dirt particles.

Figure 5:
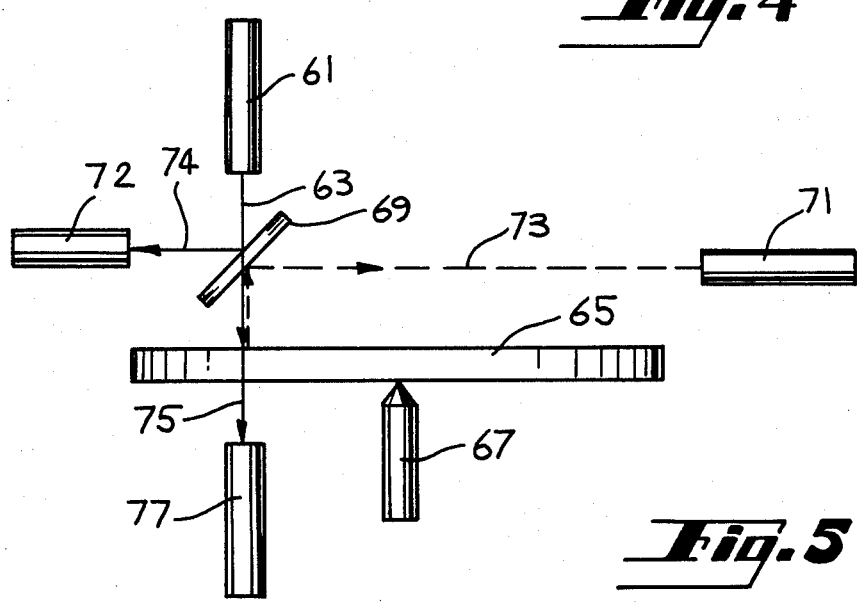
FIG. 5 is an optical data disk reading system in accord with the present invention.

With reference to FIG. 5 a data recovery system in accord with the present invention is shown. An optical source, such as a laser 61 has a beam 63 directed to recording medium 65 constructed in accord with the medium construction described with reference to FIG. 2. Such a medium may be adapted for rotation on a spindle 67 or may be a stationary data card read by a scanning optical system. Light beam 63 is directed toward the medium 65 and two optical signals are derived after the beam impinges on the medium. Specularly reflected light is deflected by the partially transmissive mirror 69 toward detector 71, which detects the amplitude of reflected beam component 73. Transmitted beam component 75 is delivered to another detector 77 so that the amplitude of the transmitted component can be converted to a proportional electrical signal in a similar manner as detector 71 converts the reflected beam component 73 to a proportional electrical signal. The Table below indicates the manner in which the surface reflectivity and optical density can be used to separate prerecorded and user data and to isolate the presence of particulates, so that only unambiguous user or prerecorded data will be read by the system.

TABLE

| Surface Condition | Typical Surface Reflectivity (Red or Infrared light normal to surface) | Typical Light Transmission Opitical Density (Red or Infrared light normal to surface) |
| --- | --- | --- |
| Surface processed as described-recording field | 40% | 1.5 |
| A. Recorded data pit in field | 8% | 0.7 |
| B. Foreign particulate matter in field | 5–15% | 2.0 |
| C. Prerecorded black silver through emulsion (Fig. 2) | 8% | 3.0 |
| D. Black silver on back of normal surface or field (Fig. 3) | 40% | 4.5 |
| E. Inhomogeneity in metal/organic reflective composite (surface) | 20–30% | 1.0 |

The prerecorded data may be distinguished from pits indicative of user data in the reflective surface because in transmission the typical optical density difference is 3.0 compared to 0.7, even though surface reflectivities are similar. Particulate matter or dirt may be distinguished because although the reflectivity caused by particulates may resemble prerecorded data, a dirt particle has an optical density of 2.0 compared to 0.7 for data and 3.0 for a prerecorded dark spot. For a medium processed in accord with FIG. 3, optical densities could be made even greater for further separation of user and prerecorded data on the one hand and particulates on the other hand.

In FIG. 5, a third detector 72 samples the output of laser source 61 by receiving an incident beam component 74 from mirror 69. Detector 72 converts the optical signal to a proportional electrical signal. It is important to sample the strength of the incident beam in order to convert the electrical signals from detectors 71 and 77 to ratios for percentages of the incident light. Since the incident beam must equal the amount of light transmitted plus the amount of light reflected plus the amount of light absorbed by the medium, percentages may be readily calculated by a computer, or manually if necessary. Since the amount of light absorbed by the medium can be determined experimentally, during calibration procedures, the task of converting the signals received in detectors 71 and 77 to percentages is straightforward, so long as the source remains constant. By detecting source component 74, the incident beam strength can be monitored for any departure from calibration values. Consider the intensity of the laser beam to be $I_B$. What is reflected is $I_B r$ where r is the total reflectivity (specular reflection plus scattering). What enters the surface is $I_B(1-r)$ and what is transmitted through the medium is $I_B(1-r)t$ where t is the transmissivity. The laser beam power absorbed in the media is $I_B(1-r)(1-t)$.

Figure 6:
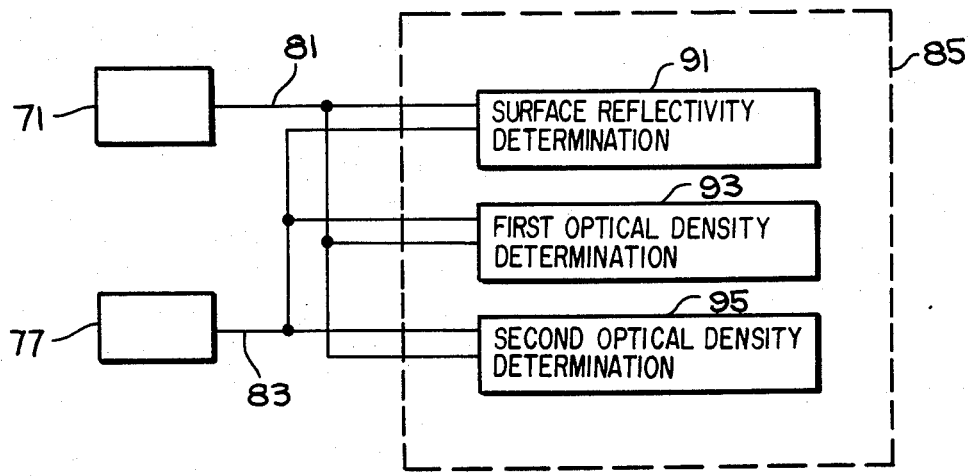
FIG. 6 is a diagram of a scheme for correlating reflected and transmitted beam components.

With reference to FIG. 6, the two detectors 71 and 77 have electrical outputs 81 and 83 respectively. These outputs are electrically connected through analog-to-digital converters, not shown, to computer 85 indicated by a dashed line. Within the computer is a program which converts the signals detected from detectors 71 and 77 from signal intensities to ratiometric or percentage values.

Computer 85 contains internal programs for comparing the digital signals derived from detectors 71 and 77. Comparisons are made to determine in block 91 whether surface reflectivity exceeds 18%. A second determination, illustrated diagramatically in block 93 is whether optical density exceeds 1.7. A third determination, illustrated diagramatically by block 95, is whether optical density exceeds 2.5. These determinations are necessary for ascertaining which of the conditions existing in the Table applies to the detected signals. Condition A in the Table, detection of a recorded pit, exists when the three tests indicated by blocks 91, 93 and 95 are all negative. Condition B in the Table, detection of a foreign particle, exists when blocks 91 and 95 are negative and block 93 is affirmative. Condition C in the Table, detection of prerecorded black silver, exists when block 91 is negative and blocks 93 and 95 are affirmative. Condition D in the Table, detection of black silver on back of normal surface, exists when blocks 91, 93 and 95 are all affirmative. These determinations are made instantaneously by logic circuits which respond to incoming data at the data rate. Condition E in the Table, detection of an inhomogeneity in the metal/organic reflective surface composite, exists when blocks 93 and 95 are negative and 91 is affirmative.

Figure 7:
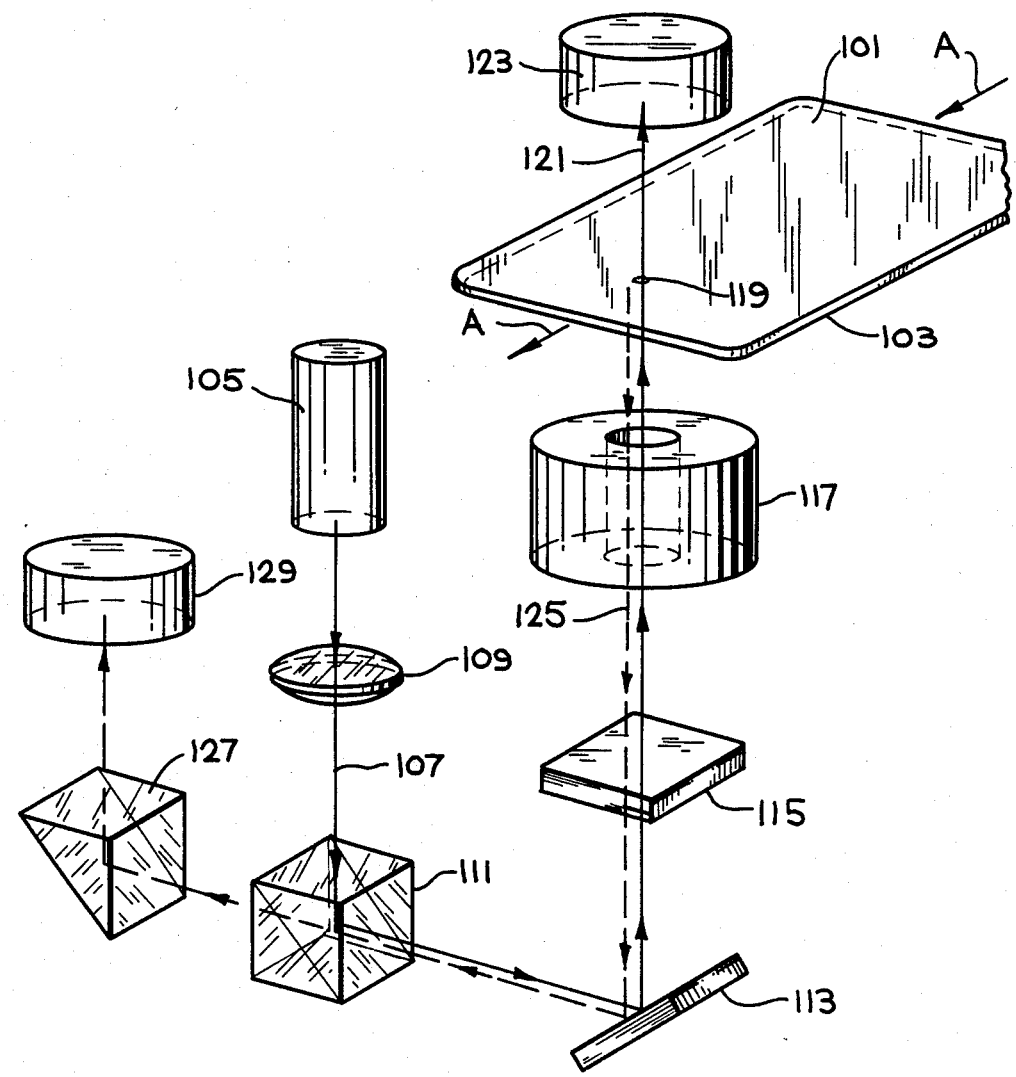
FIG. 7 is an optical data card reading system in accord with the present invention.

With reference to FIG. 7, a data card 101 is of the type having a reflective layer 103 on the underside of the card, not visible in the figure. The layer and the underlayer supporting it has a composite reflectivity ranging between 50% and 30% and a transmissivity in the range of 10% to 0.1% of the light actually entering the surface of the medium. The absorptivity of this material is within the range of 90% to 99.9% of light actually entering the surface of the medium. The cross section of the material may resemble the recording medium of FIG. 2 or FIG. 3. A laser, such as the semiconductor laser 105 directs a beam 107 along an optical path including focussing lens 109, beam splitter 111, mirror 113, quarter wave plate 115 and focussing optics 117 onto an impingement point 119 on the medium. A first portion of the beam, 121 travels through the card and to the first detector 123 where the optical signal is converted to a proportional electrical signal. A second portion 125 of the beam is reflected from spot 119. The dashed line is indicative of the reflected beam portion. This second beam portion is parallel to the incident beam 107 between reflective layer 103 and beam splitter 111 since specular reflection occurs at the impingement point 119. Beam portion 125 travels through beam splitter 111 to prism 127 and then to the second detector 129 where the reflected light beam portion is converted to a proportional electrical signal.

Prior to reading data, correlation measurements are made using the system of FIG. 7 to record first and second detector signals for pits in the card created by laser writing, thin spots in the reflective surface layer and low reflectivity spots caused by particulate matter at the point of beam impingement. These conditions give rise to surface conditions similar to those described in the Table. The electrical signals from the detectors are transmitted to correlation registers of the type illustrated and described with reference to FIG. 6. From this correlation means, a decision may be made regarding which of the conditions illustrated in the Table is applicable, in real time, for signals being received from the detectors 123 and 129.

It will be realized that to read the medium 101, the card may be moved in the direction indicated by arrow A or the incident beam may be deflected by a beam scanner mechanism, not illustrated.

By comparing the reflected and transmitted beam components, errors in reading data may be substantially reduced. The effect of dirt particles and the like, as well as media defects, may be substantially reduced and the signal-to-noise ratio of optical data recording media increased or equivalently the error rate is reduced.

I claim:

1. A laser system for reading data on an optical data storage medium having different optical characteristics comprising,
    a data medium having a high reflectivity surface layer and a light absorptive underlayer, the medium having prerecorded data of a first absorptivity and user recorded data of a second absorptivity, and imperfections having a third absorptivity, each of the data and the imperfections having different combinations of specularly reflected and optically transmitted beam components with respect to an incident laser beam,
    first and second detector means for simultaneously detecting said specularly reflected and optically transmitted beam components and generating first and second electrical signals corresponding to a quantity of light received,
    correlation means connected to said detector means for comparing the levels of said electrical signals with stored reference levels of specular reflectivity and optical transmissivity, the combination of said levels being indicative of different data and imperfection conditions of the medium, said levels from said detector means being first converted to ratiometric values in accordance with the strength of said incident laser beam.

2. The system of claim 1 wherein said quantity of the light received is light amplitude.

3. The system of claim 1 further defined by an infrared laser generating said incident laser beam.

4. A laser system for discriminating between data and foreign matter of imperfections on an optical data medium comprising, a data medium having a high reflectivity surface layer and a light absorptive underlayer, the medium having prerecorded data of a first absorptivity and user recorded data of a second absorptivity, and imperfections having a third absorptivity, each of the data and the imperfections having different combinations of specularly reflected and optically transmitted beam components with respect to an incident laser beam, a laser having a beam directed onto said medium via a first optical path, a first portion of the beam being transmitted through the medium and impinging on a first detector, a second portion of the beam being specularly reflected from the medium via a second optical path having part of the path in common with the first optical path but diverging at a beam splitter disposed to transmit the specularly reflected beam to a second detector, a correlation means connected to the first and second detectors for comparing signal levels, as represented by ratiometric values in accordance with the strength of said incident laser beam, from the first and second detectors with stored reference levels of specular reflectivity and optical transmissivity, the combination of said levels being indicative of different data and imperfection conditions of the medium.

5. The laser system of claim 4 wherein the medium comprises a substrate, a partially transmissive, partially reflective layer over the substrate and a silver-halide emulsion, processed black, on the back side of the substrate.

6. The laser system of claim 5 wherein the processed black emulsion on the back side of the substrate incorporates a line pattern.

7. The laser system of claim 5 wherein the reflective layer is derived from a silver-halide emulsion having prerecorded data areas developed black and data areas for laser recording processed to a partially reflective state.

8. The laser system of claim 4 wherein said data medium has prerecorded data areas having lower reflectivity and higher transmissivity characteristics than non-data areas.

9. A method for discriminating between data and foreign matter or imperfections on a partially specular reflective, partially transmissive optical data medium comprising, providing a partially specular reflective, partially transmissive optical data medium having different combinations of specular reflectivity and optical transmissivity characteristics for prerecorded data, user recorded data and imperfections with respect to an incident laser beam, simultaneously detecting reflected and transmitted beam components resulting from said incident laser beam, correlating with specularly reflected and transmitted beam components after conversion to ratio-metric values with stored reference levels of specular reflectivity and optical transmissivity, the combination of said levels indicating different data and imperfection conditions of the medium.

10. The method of claim 9 wherein said optical data medium is provided with prerecorded data areas having lower reflectivity and higher transmissivity characteristics than non-data areas.

* * * * *